United States Patent
Granström

(10) Patent No.: US 10,013,614 B2
(45) Date of Patent: Jul. 3, 2018

(54) USING AN IMAGE MATCHING SYSTEM TO IMPROVE THE QUALITY OF SERVICE OF A VIDEO MATCHING SYSTEM

(71) Applicant: Google Inc., Mountain View, CA (US)

(72) Inventor: Johan Georg Granström, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 79 days.

(21) Appl. No.: 15/197,174

(22) Filed: Jun. 29, 2016

(65) Prior Publication Data

US 2018/0005038 A1    Jan. 4, 2018

(51) Int. Cl.
G06K 9/00    (2006.01)

(52) U.S. Cl.
CPC ...... G06K 9/00744 (2013.01); G06K 9/00711 (2013.01); G06K 9/00765 (2013.01)

(58) Field of Classification Search
CPC ....... G06K 9/00744–9/00751; G06K 9/00711; G06K 9/00765
USPC ........ 382/209, 173, 190, 218; 709/201, 203, 709/206; 715/719; 370/329, 330, 436
See application file for complete search history.

(56) References Cited

U.S. PATENT DOCUMENTS

| | | | | |
|---|---|---|---|---|
| 8,494,234 B1* | 7/2013 | Bozinovic | .......... | G06K 9/00744 382/103 |
| 8,612,517 B1* | 12/2013 | Yadid | ............... | H04N 21/25891 709/201 |
| 8,645,485 B1* | 2/2014 | Yadid | ............... | H04N 21/25891 709/203 |

(Continued)

FOREIGN PATENT DOCUMENTS

KR    10-2008-0078217 A    8/2008
WO    WO 2014-077466 A1    5/2014

OTHER PUBLICATIONS

Green, H., "Theft, Lies, and Facebook Video," medium.com, Aug. 2, 2015, 9 pages, can be retrieved at <URL:https://medium.com/@hankgreen/theft-lies-and-facebook-video-656b0ffed369#.fs014xhih>.

(Continued)

*Primary Examiner* — Aaron W Carter
(74) *Attorney, Agent, or Firm* — Young Basile Hanlon & MacFarlane, P.C.

(57) ABSTRACT

A system receives a subject video. The system identifies dynamic segments and semi-static segments within the subject video. The system determines matches between the dynamic segments of the subject video and reference dynamic segments of reference videos. Similarly, the system determines matches between the semi-static segments of the subject video and reference semi-static segments of reference videos. The system generates the match merge list including one or more entries. Each entry of the match merge list includes an indication of a grouped segment of the subject video including sequential occurrences of a dynamic segment and a semi-static segment of the subject video, and an indication of a reference grouped segment of a reference video including sequential occurrences of a reference dynamic segment and a reference semi-static segment of the reference video, where the reference dynamic segment matches the dynamic segment and the reference semi-static segment matches the semi-static segment.

24 Claims, 5 Drawing Sheets

(56) References Cited

U.S. PATENT DOCUMENTS

| | | | | |
|---|---|---|---|---|
| 8,897,253 | B2* | 11/2014 | Shin | H04L 5/001 |
| | | | | 370/329 |
| 9,015,072 | B2* | 4/2015 | Wu | G06Q 10/087 |
| | | | | 705/28 |
| 9,143,742 | B1* | 9/2015 | Amira | H04N 7/181 |
| 9,373,169 | B2* | 6/2016 | Varekamp | G06T 7/70 |
| 9,462,230 | B1* | 10/2016 | Agrawal | H04N 7/155 |
| 9,510,044 | B1* | 11/2016 | Pereira | H04N 21/44008 |
| 9,529,840 | B1* | 12/2016 | Granstrom | G06F 17/30784 |
| 2004/0056881 | A1 | 3/2004 | Nagatani et al. | |
| 2008/0165861 | A1* | 7/2008 | Wen | H04N 19/139 |
| | | | | 375/240.26 |
| 2009/0052784 | A1* | 2/2009 | Covell | G06F 17/30784 |
| | | | | 382/209 |
| 2013/0177252 | A1 | 7/2013 | Hefeeda et al. | |
| 2014/0195548 | A1 | 7/2014 | Harron | |
| 2014/0236988 | A1* | 8/2014 | Harron | G06F 17/30047 |
| | | | | 707/769 |
| 2017/0026718 | A1* | 1/2017 | Yabu | H04N 21/8352 |
| 2017/0034542 | A1* | 2/2017 | Yabu | H04N 21/234 |
| 2017/0371930 | A1* | 12/2017 | Bilobrov | G06F 17/30321 |
| 2017/0371962 | A1* | 12/2017 | Bilobrov | G06F 17/30784 |
| 2017/0371963 | A1* | 12/2017 | Bilobrov | G06F 17/30784 |
| 2018/0082125 | A1* | 3/2018 | Katz | G06K 9/00744 |

OTHER PUBLICATIONS

PCT International Search Report and Written Opinion for PCT/US2016/068115, dated Mar. 14, 2017, 7 pages.

Written Opinion of the International Searching Authority for International Application No. PCT/US2016/068115; dated Mar. 14, 2017; pp. 1-4.

* cited by examiner

USING AN IMAGE MATCHING SYSTEM TO IMPROVE THE QUALITY OF SERVICE OF A VIDEO MATCHING SYSTEM

BACKGROUND

1. Field of the Disclosure

This disclosure pertains in general to video processing and more specifically to video and image matching.

2. Description of the Related Art

Traditionally, known video matching techniques are used to match a subject video, or portions thereof, with reference videos, or portions thereof, to determine one or more reference videos that match the subject video. Implementing only video matching techniques for matching a subject video including dynamic content (e.g., moving video content) and semi-static content (e.g., image content) with reference videos including dynamic content and semi-static content can be time consuming and computationally expensive, and can decrease precision and recall of reference videos that match the video.

SUMMARY

A system is provided for generating a match merge list. A system receives a subject video, for example, from a content provider. The system identifies one or more dynamic segments within the subject video and identifies one or more semi-static segments within the subject video. The system determines matches between the one or more dynamic segments of the subject video and one or more reference dynamic segments of one or more reference videos. Similarly, the system determines matches between the one or more semi-static segments of the subject video and one or more reference semi-static segments of one or more reference videos. The system generates the match merge list including one or more entries. Each entry of the match merge list includes an indication of a grouped segment of the subject video including sequential occurrences of a dynamic segment of the subject video and a semi-static segment, and an indication of a reference grouped segment of a reference video including sequential occurrences of a reference dynamic segment and a reference semi-static segment, where the reference dynamic segment matches the dynamic segment and the reference semi-static segment matches the semi-static segment.

BRIEF DESCRIPTION OF THE DRAWINGS

The teachings of the embodiments disclosed herein can be readily understood by considering the following detailed description in conjunction with the accompanying drawings.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures.

DETAILED DESCRIPTION

I. Configuration Overview

Implementing video matching techniques and image matching techniques together for matching a subject video including dynamic content (e.g., moving video content) and semi-static content (e.g., image content) with reference videos including dynamic content and semi-static content, is advantageous for several reasons including improving resource usage, precision and recall of matches, and reducing processing time and associated computational expenses. The video matching techniques can be implemented by matching dynamic content of the subject video with dynamic content of the reference videos and the image matching techniques can be implemented by matching semi-static content of the subject video with semi-static content of the reference videos. Sequential occurrences of dynamic content and semi-static content of the subject video matching sequential occurrences of reference dynamic content and reference semi-static content of a reference video can be determined and used for matching portions the subject video to portions of reference videos for abuse detection.

II. Computing Environment

Figure 1:
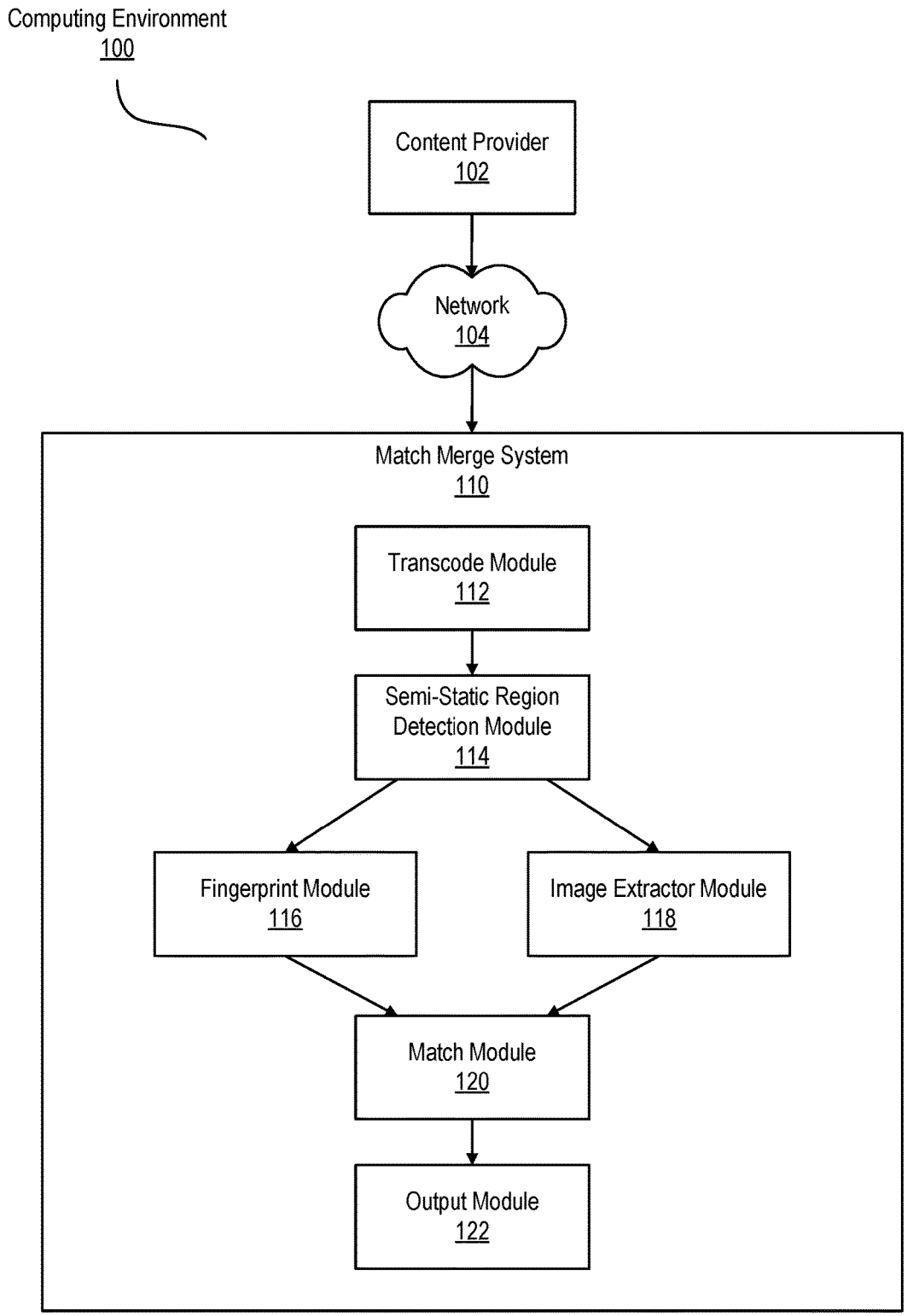
FIG. 1 illustrates a flow diagram of a computing environment for segmenting and identifying a subject video, according to one embodiment.

FIG. 1 illustrates a flow diagram of a computing environment 100, according to one embodiment. The computing environment 100 includes a content provider 102 and a match-merge system 110 (hereinafter referred to as "system 110"). Each of these entities includes computing devices that may be physically remote from each other but which are communicatively coupled by a computer network 104. The computer network 104 is typically the Internet, but can be any network(s), including but not limited to a LAN, a MAN, a WAN, a mobile wired or wireless network, a private network, a virtual private network, or a combination thereof. In alternative instances, different or additional components can be used.

The content provider 102 provides a subject video to the system 110 via the network 104. An example of a content provider 102 includes a content creator, such as a video producer. Content providers 102 can also include video hosting and streaming sites, search engines, advertisers, and social networking sites. The subject video includes one or more video frames where the number of video frames of the subject video is dependent on a frame rate of the subject video, duration of the subject video, etc.

The content provider 102 can provide the subject video to the system 110 in a compressed state or an uncompressed state. The content provider 102 can encode an unencoded representation (i.e., raw format) of the subject video into a first format (i.e., compressed format) using a first codec.

Example codecs include H.265/MPEG-H HEVC, H.264/MPEG-4 AVC, H.263/MPEG-4 Part 2, H.262/MPEG-2, WMV, MS MPEG-4v3, etc. The content provider 102 can provide the subject video in the first format to the system 110.

The system 110 receives the subject video from the content provider 102, processes the subject video, and outputs a match merge list. Processing the subject video can include transcoding the subject video, determining the presence of dynamic segments and semi-static segments of the subject video, generating fingerprints for the dynamic segments and images for the semi-static segments, matching the fingerprints to reference fingerprints and the images to reference images, and determining the match merge list based on the matches. The match merge list includes one or more entries, each entry including an indication of a grouped segment of the subject video including sequential occurrences of a dynamic segment and a semi-static segment and a corresponding grouped reference segment of a reference video including similar sequential occurrences of a matching reference dynamic segment and a matching reference semi-static segment, respectively.

As illustrated in FIG. 1, system 110 includes a transcode module 112, a semi-static region detection module 114, a fingerprint module 116, an image extractor module 118, a match module 120, and an output module 122. In alternative instances, different or additional components can be used.

The transcode module 112 receives the subject video, transcodes the subject video, and outputs a transcoded version of the subject video. Transcoding the subject video can include decoding the subject video from the first format (i.e., compressed format) into an unencoded representation (i.e., raw format) using the first codec. Transcoding the subject video can further include encoding the unencoded representation of the subject video into a second format using a second codec, the second format and the second codec different from the first format and the first codec, respectively. In one example, storing the subject video in the second format can require less storage than storing the subject video in the first format. In another example, analyzing the subject video in the second format can be less computationally expensive than analyzing the subject video in the first format. The transcode module 112 can transcode the subject video using lossy transcoding or using lossless transcoding.

The semi-static region detection module 114 (hereinafter referred to as "detection module 114") receives the subject video from the transcode module 112 and segments the subject video into one or more segments. The detection module 114 also identifies and divides between segments identified as dynamic segments and those identified as semi-static segments. The detection module 114 outputs either the dynamic segments and the semi-static segments themselves, or it outputs one or more lists identifying each such segment and their respective start/stop times and/or durations.

Figure 3:
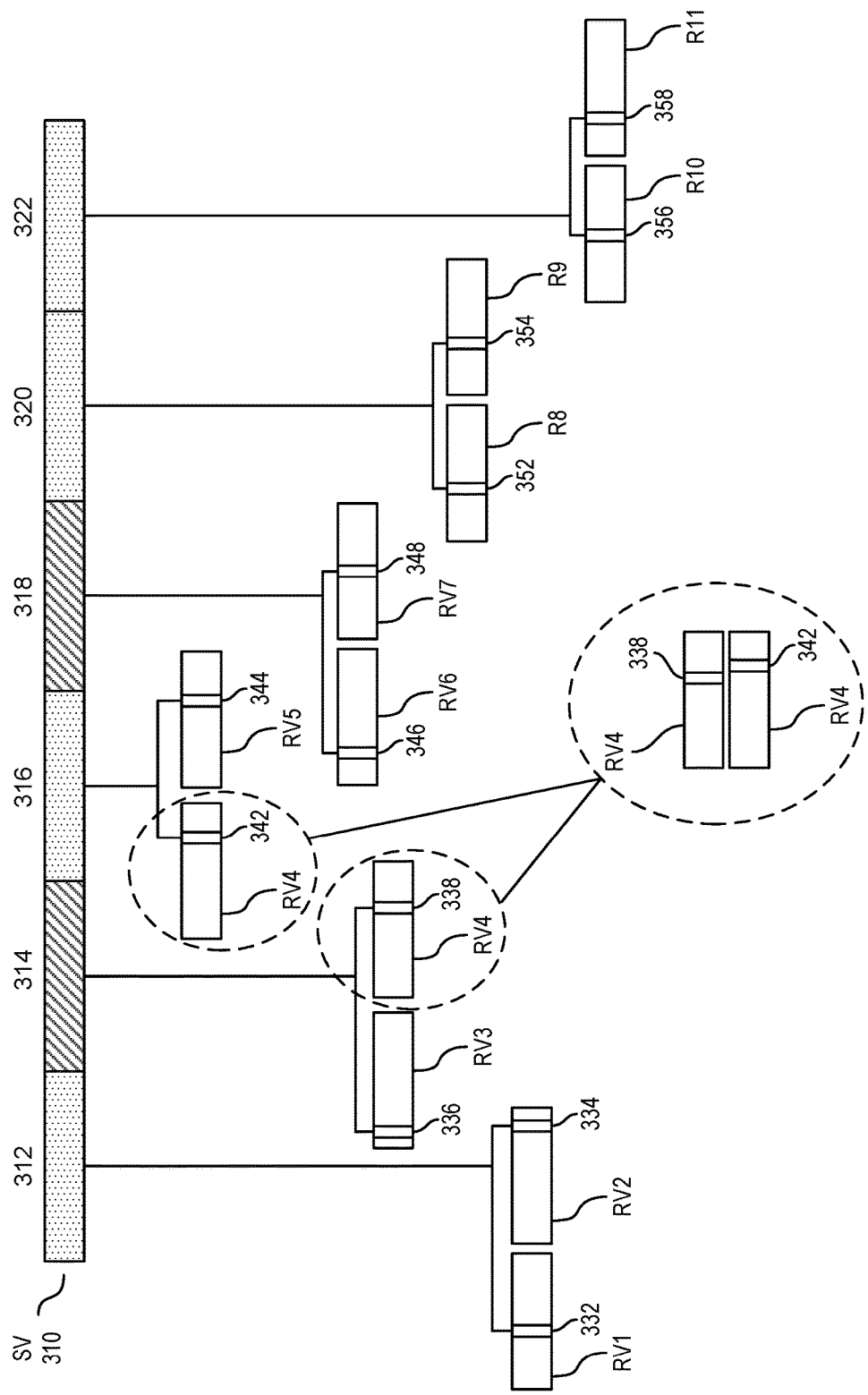
FIG. 3 illustrates an example subject video including dynamic segments and semi-static segments, and reference videos including dynamic segments and/or semi-static segments, according to one embodiment.

Referring briefly to FIG. 3, it illustrates a subject video (SV) 310, according to one embodiment. For example, the detection module 114 segments the subject video 310 into segments 312 through 322. The detection module 114 identifies segments 314 and 318 as dynamic segments (indicated by a backslash pattern) and identifies segments 312, 316, 320, and 322 as semi-static segments (indicated by a dotted pattern).

A dynamic segment, as described herein, refers to a segment including content that varies more than a threshold amount over some period of time (e.g., a time segment). An example of a dynamic segment includes video content where the content of the video frames change sufficiently from frame to frame. A semi-static segment, as described herein, refers to a segment including content that varies less than the threshold amount over some period of time (e.g., a time segment). An example of a semi-static segment includes video content where the content of the video frames do not change sufficiently from frame to frame. This can be the case where successive video frames project the same or a similar image, or where the same graphic or text appears on successive video frames. A semi-static segment can also include video content where the content of the video frames include the same graphics, text, or whole images repeated in sequence. An example includes a simple graphic that merely rotates or moves, similar to a traditional "screensaver." However, as a counter example, video content where the image in each video frame moves, such as a slowly panning camera, is considered a dynamic segment, and the threshold is set accordingly to distinguish.

To identify and divide the segments, the detection module 114 determines whether each segment of the one or more segments of the subject video is a dynamic segment or a semi-static segment. There are several ways to detect whether a segment is a semi-static segment. One approach is to consider a segment semi-static as long as the P- and B-frames (delta frames) are of very small size. However, this method would accept a slowly moving scene as a semi-static segment, which is not optimal. Another approach is to look at the size of the delta between an initial frame of the segment and subsequent frames of the segment and extend the semi-static segment as long as the delta between a frame and the initial frame is below a threshold.

The fingerprint module 116 receives the dynamic segments determined by the detection module 114, generates a fingerprint for each of the dynamic segments, and outputs the generated fingerprints. The fingerprint module 116 may receive the video content of the dynamic segments themselves or may receive a list identifying the dynamic segments and their respective start/stop times and/or durations. Continuing the previous example, the fingerprint module 116 receives the dynamic segments 314 and 318 determined by the detection module 114 and generates a fingerprint for each of the dynamic segments 314 and 318.

A fingerprint is a compressed representation of a unique set of inherent properties and/or characteristics of the video content of a dynamic segment. The unique set of inherent properties and/or characteristics included in the fingerprint can be used to identify other instances of the dynamic segment, or portions thereof, the fingerprint is associated with. The fingerprint is independent of video resolution, video bit-rate, video encoding, video file format, etc. The fingerprint may also include an audio fingerprint of the audio content associated with the video content. Storing and processing fingerprints consumes fewer resources than storing and processing the entirety of the underlying video and audio content of the dynamic segment from the subject video.

A fingerprint may also include metadata information about an underlying video, a dynamic segment, and an association between the fingerprint and the corresponding dynamic segment of the underlying video. For example, this association may be in the form of a video identifier and a segment identifier. The video identifier identifies the underlying video the fingerprint is associated with, and the segment identifier identifies the period of time of the underlying video the fingerprint is associated with. The segment identifier can further include information regarding a temporal relationship between the segment and the underlying video, such as the start/stop times and/or a duration encapsulated by the fingerprint.

The fingerprint module 116 generates a fingerprint for each of the dynamic segments by implementing a fingerprinting algorithm. Generally, generating a fingerprint includes identifying and extracting features of the dynamic segment and compressing the identified and extracted features into a fingerprint. These steps themselves may further include key frame analysis, color analysis, scene analysis, object tracking, and/or motion estimation. In some instances, the fingerprint is a statistical sample of the dynamic segment. The fingerprint module 116 samples the dynamic segment and includes information of the samples in the fingerprint. For example, if the dynamic segment includes 120 video frames, the fingerprint module 116 samples the dynamic segment once every 10 video frames and includes information from the 12 sampled video frames in the fingerprint. In one embodiment, more than one fingerprint may be generated per dynamic segment.

The image extractor module 118 receives the semi-static segments determined by the detection module 114, extracts an image from each of the semi-static segments, and outputs the extracted images. The image extractor module 118 may receive the video content of the semi-static segments themselves or may receive a list identifying the semi-static segments and their respective start/stop times and/or durations. Continuing the previous example, the image extractor module 118 receives the semi-static segments 312, 316, 320, and 322 determined by the detection module 114 and extracts an image from each of the semi-static segments 312, 316, 320, and 322.

In addition to actual image content, extracted images may also include metadata information about an underlying video, a semi-static segment, and an association between the image and the corresponding semi-static segment of the underlying video. For example, this association may be in the form of a video identifier and a segment identifier. The video identifier identifies the underlying video the image is associated with, and the segment identifier identifies the period of time of the underlying video the image is associated with. The segment identifier can further include, for example, information regarding a temporal relationship between the segment and the underlying video, such as the start/stop times and/or duration encapsulated by the image.

The image extractor module 118 extracts an image from the set of frames in the semi-static segment. To do this, the image extractor module 118 may, for example, extract an image from any frame in the semi-static segment, or may generate a composite or other similar aggregation of the frames in the semi-static segment.

The match module 120 receives a fingerprint associated with each of the dynamic segments from the fingerprint module 116 and an image associated with each of the semi-static segments from the image extractor module 118 for the subject video, matches the received fingerprints with reference fingerprints and the received images with reference images, and determines a match merge list. The creation of the match merge list is described in Section III below. The output module 122 outputs the match merge list. The match merge list may be used to identify matching reference videos for content identification, verification, abuse detection, and the like.

III. Match Module

Figure 2:
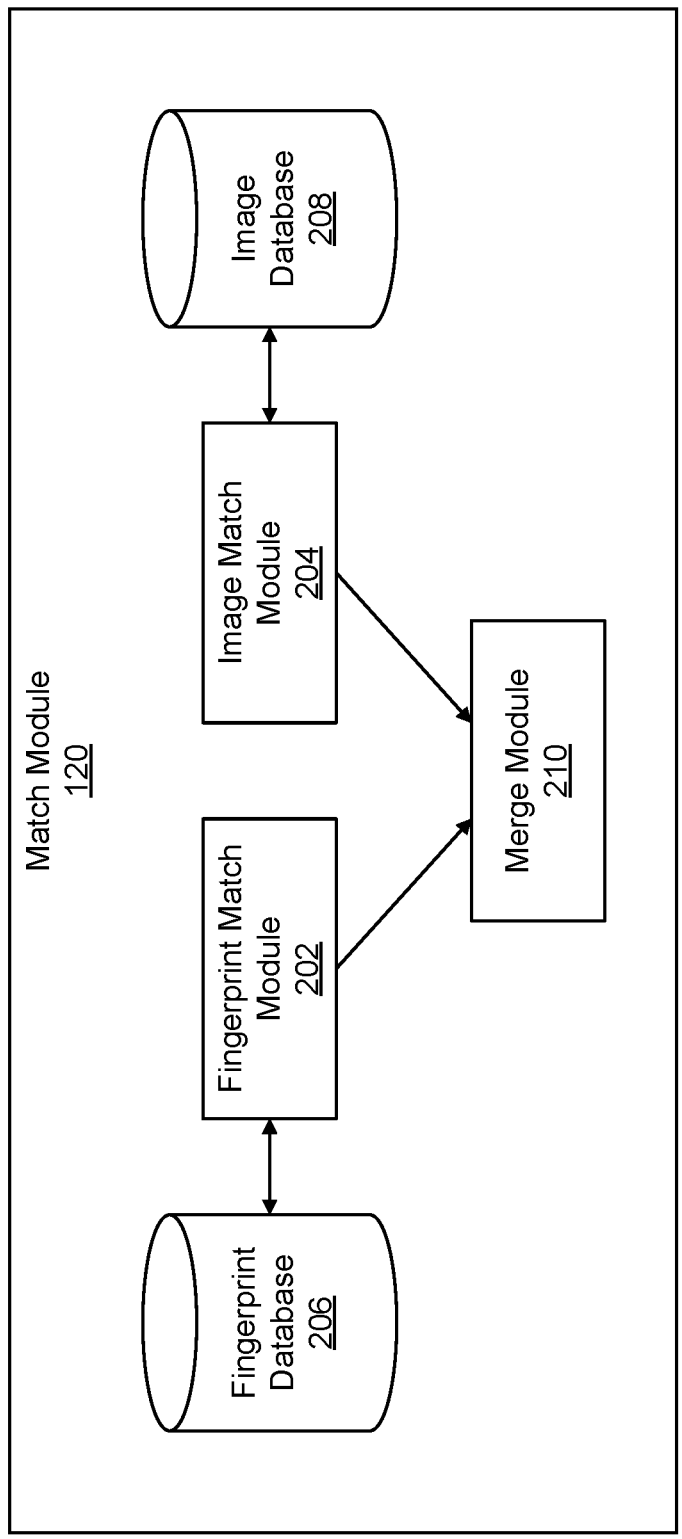
FIG. 2 illustrates components of a match module for generating a match merge list, according to one embodiment.

FIG. 2 illustrates a flow diagram of the logical components of the match module 120 of FIG. 1, according to one embodiment. The match module 120 includes a fingerprint match module 202, an image match module 204, a fingerprint database 206, image database 208, and a merge module 210. In alternative instances, different or additional components can be used.

The fingerprint match module 202 receives a fingerprint associated with each of the dynamic segments of the subject video from the fingerprint module 116, determines matches between each of the received fingerprints and reference fingerprints stored in the fingerprint database 206, and, for each received fingerprint, outputs one or more reference fingerprints that match the received fingerprint. The fingerprint match module 202 determines the matches by comparing the fingerprint to the reference fingerprints. In some instances, the fingerprint match module 202 determines a match likelihood for each of the one or more reference fingerprints that match the received fingerprint. The match likelihood represents a numerical likelihood (also referred to as a confidence value) that a given reference fingerprint matches the received fingerprint. The match likelihood may also be output along with the one or more matching reference fingerprints.

Continuing the previous example, the fingerprint match module 202 receives a fingerprint associated with each of the dynamic segments 314 and 318. The fingerprint match module 202 determines the fingerprint associated the dynamic segment 314 matches reference fingerprints associated with reference dynamic segments 336 and 338 of reference videos RV3 and RV4, respectively. Similarly, the fingerprint match module 202 determines the fingerprint associated with the dynamic segment 318 matches reference fingerprints associated with the reference dynamic segments 346 and 348 of reference videos RV6 and RV7, respectively.

In some instances, the fingerprint match module 202 determines that there are no matches between a received fingerprint and any reference fingerprint stored in the fingerprint database 206. This is expected behavior, particularly in the instance where the received fingerprint is associated with a dynamic segment whose content is newer than that of the reference videos. In these instances, the fingerprint module 116 does not output any reference fingerprints.

The image match module 204 receives an image for each of the semi-static segments of the video from the image extractor module 118, determines matches between each of the received images and reference images stored at the image database 208, and, for each received image, outputs one or more reference images that match the received image. The image match module 204 determines the matches by comparing keypoints and/or features of the image to those of the reference images. Additionally, or alternatively, the image match module 204 can implement feature transforms based on features of the image and those of the reference images to determine the matches. Implementing feature transforms can determine matches between an image and a reference image even when the image and the reference image vary slightly (i.e., one is a simple variation of the other). In some instances, the image match module 204 determines a match likelihood for each of the one or more reference images that match the received image. The match likelihood represents a numerical likelihood that a given reference image matches the received image. The match likelihood may also be output with the one or more matching reference images.

Continuing the previous example, the image match module 204 receives an image for each of the semi-static segments 312, 316, 320, and 322. The image match module 204 determines the image associated with the semi-static segment 312 matches reference images associated with reference semi-static segments 332 and 334 of reference videos RV1 and RV2, respectively. Similarly, the image match module 204 determines the images associated with the semi-static segments 316, 320, and 322 match reference images associated with reference semi-static segments 342, 344, 352, 354, 356, and 358 of reference videos RV4, RV5, RV8, RV9, RV10, and RV11, respectively.

In some instances, the image match module 204 determines that there are no matches between a received image and any reference image stored in the image database 208. This is expected behavior, particularly in the case where the received image may is with a semi-static segment whose content is newer than that of the reference videos. In these instances, the image match module 204 does not output the received image or any reference images for the received image.

The merge module 210 receives information from the fingerprint match module 202 and the image match module 204 and determines sequential occurrences of dynamic segments and semi-static segments of the subject video that match sequential occurrences of dynamic segments and semi-static segments of one or more reference videos.

The information received from the fingerprint match module 202 includes the fingerprints of the subject video and, for each of the one or more received fingerprints, one or more matching reference fingerprints and any associated match likelihoods and metadata. Similarly, the information received from the image match module 204 includes the images extracted from the subject video and, for each of the one or more received images, one or more matching reference images, and any associated match likelihoods and metadata.

The merge module 210 determines sequential occurrences of dynamic segments and semi-static segments (and/or vice versa) of the subject video based on the segment identifiers associated with the fingerprints and the images. The merge module 210 compares the segment identifiers associated with the fingerprints to those associated with the images. Responsive to a segment identifier associated with a fingerprint temporally (by time or frame) directly following a segment identifier associated with an image (or vice versa), the merge module 210 groups the adjacent segments to create a grouped segment including at least both the dynamic segment and the semi-static segment. The grouped segment includes its own identifier that includes a video identifier and two segment identifiers, one segment identifier associated with the segment identifier of the fingerprint and the other associated with the segment identifier of the image.

Continuing the previous example, the merge module 210 compares the segment identifiers associated with the fingerprints of the dynamic segments 314 and 318 and those associated with the images of the semi-static segments 312, 316, 320, and 322 and determines sequential occurrences of the dynamic segments and the semi-static segments (or vice versa) for the subject video 310. In this example, the merge module 210 determines four sequential occurrences for the subject video 310 and creates a grouped segment for each. The first grouped segment includes the segments 312 and 314, the second grouped segment includes segments 314 and 316, the third grouped segment includes segments 316 and 318, and the fourth grouped segment includes segments 318 and 320.

The merge module 210 may also group adjacent segments responsive to segment identifiers associated with one or more consecutive fingerprints temporally directly following segment identifiers associated with one or more consecutive images (or vice versa). Here, the grouped segment identifier again includes its own identifier that includes a video identifier and a number of segment identifiers, some of which are associated with the segment identifiers of the one or more fingerprints and some of which are associated with the segment identifiers of the one or more images. Continuing the previous example, the merge module 210 groups the dynamic segment 318 and the semi-static segments 320 and 322.

As discussed above, a grouped segment includes at least both a dynamic segment and a semi-static segment. For each grouped segment, the merge module 210 compares reference video identifiers associated with reference fingerprints that match the fingerprint associated with the dynamic segment of the grouped segment and reference video identifiers associated with reference images that match the image associated with the semi-static segment of the grouped segment to determine if any of the reference video identifiers match. In other words, the merge module 210 compares the underlying information about the timing of segments in the subject video as compared to matching reference segments, for both dynamic and semi-static content, to determine if the segments from the group match those of existing reference videos.

Continuing the previous example, for the second grouped segment including the dynamic segment 314 and the semi-static segment 316, the merge module 210 compares the reference video identifiers associated with the reference fingerprints associated with the reference dynamic segments 336 and 338 and the reference video identifiers associated with the reference images associated with the reference semi-static segments 342 and 344. The merge module 210 determines the reference video identifier identifying reference video RV4 associated with the reference fingerprint associated with the reference dynamic segment 338 matches the reference video identifier identifying reference video RV4 associated with the reference image associated with the reference semi-static segment 342. Thus, the merge module 210 determines the reference dynamic segment 338 and the reference semi-static segment 342 are from a same reference video RV4.

Responsive to the reference video identifier associated with a reference fingerprint matching that of a reference image, the merge module 210 compares a reference segment identifier associated with the reference fingerprint and that associated with the reference image to determine whether the reference dynamic segment and the reference semi-static segment occur sequentially within the reference video in a same order their matching dynamic segment and semi-static segment occur sequentially in the subject video. Responsive to a segment identifier included in the reference fingerprint temporally directly following a segment identifier included in the reference image, the merge module 210 groups the adjacent reference segments to create a reference grouped segment including both the reference dynamic segment and the reference semi-static segment.

Continuing the previous example, the merge module 210 compares the reference segment identifier associated with the reference fingerprint associated with the reference dynamic segment 338 and the reference segment identifier associated with the reference image associated with the reference semi-static segment 342. The merge module 210 determines the reference dynamic segment 338 and the reference semi-static segment 342 occur sequentially within the reference video RV4 in a same order the matching dynamic segment 314 and semi-static segment 316 occur in the subject video 310. The merge module 210 groups the adjacent reference segments 338 and 342 to create a reference grouped segment including both the reference segments 338 and 342.

The merge module 210 determines a match merge list including one or more entries, each entry including an indication of a grouped segment of the subject video and an indication of a corresponding reference grouped segment. In some instances, the each entry further includes an aggregate match likelihood representing a numerical likelihood that a given reference grouped segment of a reference video matches a grouped segment of the subject video. The merge module 210 determines the aggregate match likelihood based on the match likelihood of a reference fingerprint associated with the reference dynamic segment of the reference grouped segment and the match likelihood of a reference image associated with the reference image of the reference grouped segment. In some instances, the merge module 210 ranks the match merge list based on the aggregate match likelihoods. The merge module 210 outputs the determined match merge list.

IV. Example Process for Generating a Match Merge List

Figure 4:
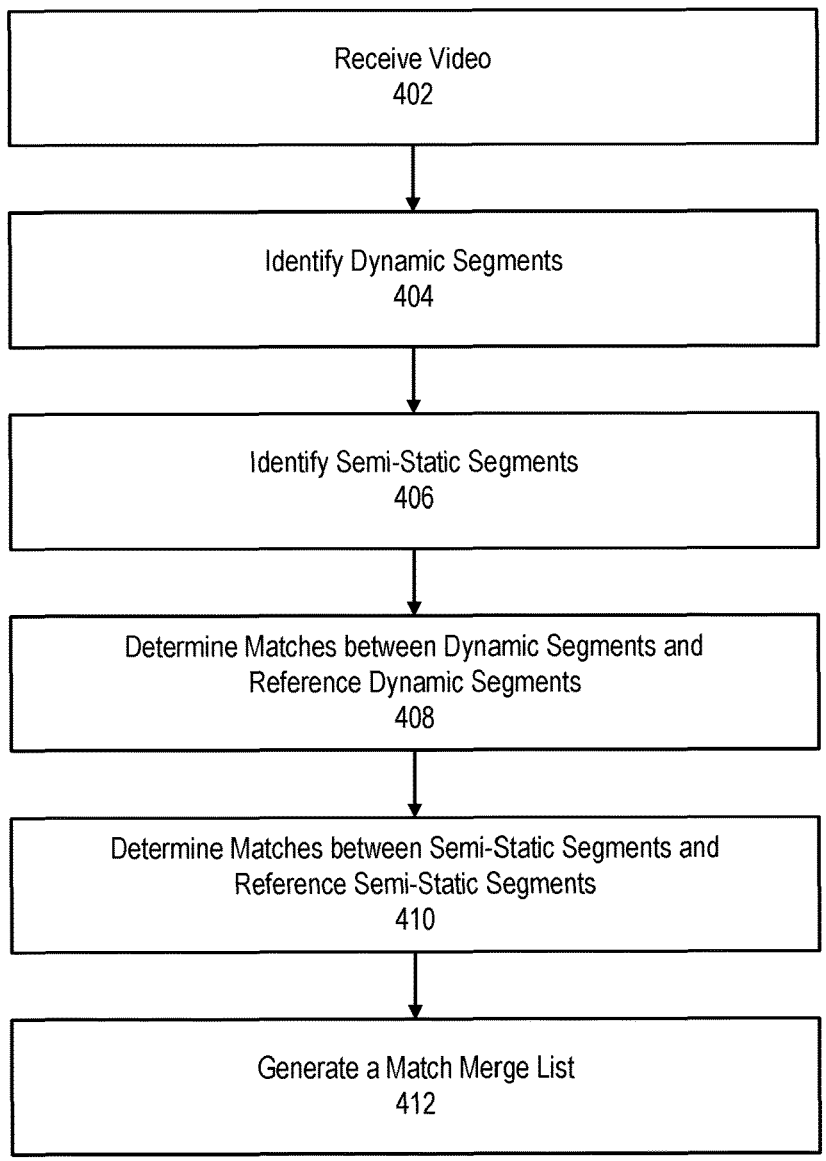
FIG. 4 illustrates a flow chart for generating a match merge list, according to one embodiment.

FIG. 4 illustrates a flow chart of a method for generating a match merge list, according to one embodiment. The system 110 receives 402 a subject video, for example, from content provider 102. The semi-static region detection module 114 identifies 406 one or more dynamic segments within the subject video and identifies 406 one or more semi-static segments within the subject video. The fingerprint match module 202 determines 408 matches between the one or more dynamic segments of the subject video and one or more reference dynamic segments of one or more reference videos. The image match module 204 determines 410 matches between the one or more semi-static segments of the subject video and one or more reference semi-static segments of one or more reference videos. The merge module 210 generates 412 a match merge list including one or more entries. Each entry of the match merge list includes an indication of a grouped segment of the subject video including sequential occurrences of a dynamic segment and a semi-static segment of the subject video, and an indication of a reference grouped segment of a reference video including sequential occurrences of a reference dynamic segment and a reference semi-static segment of the reference video, where the reference dynamic segment matches the dynamic segment and the reference semi-static segment matches the semi-static segment.

V. Computing Machine Architecture

Figure 5:
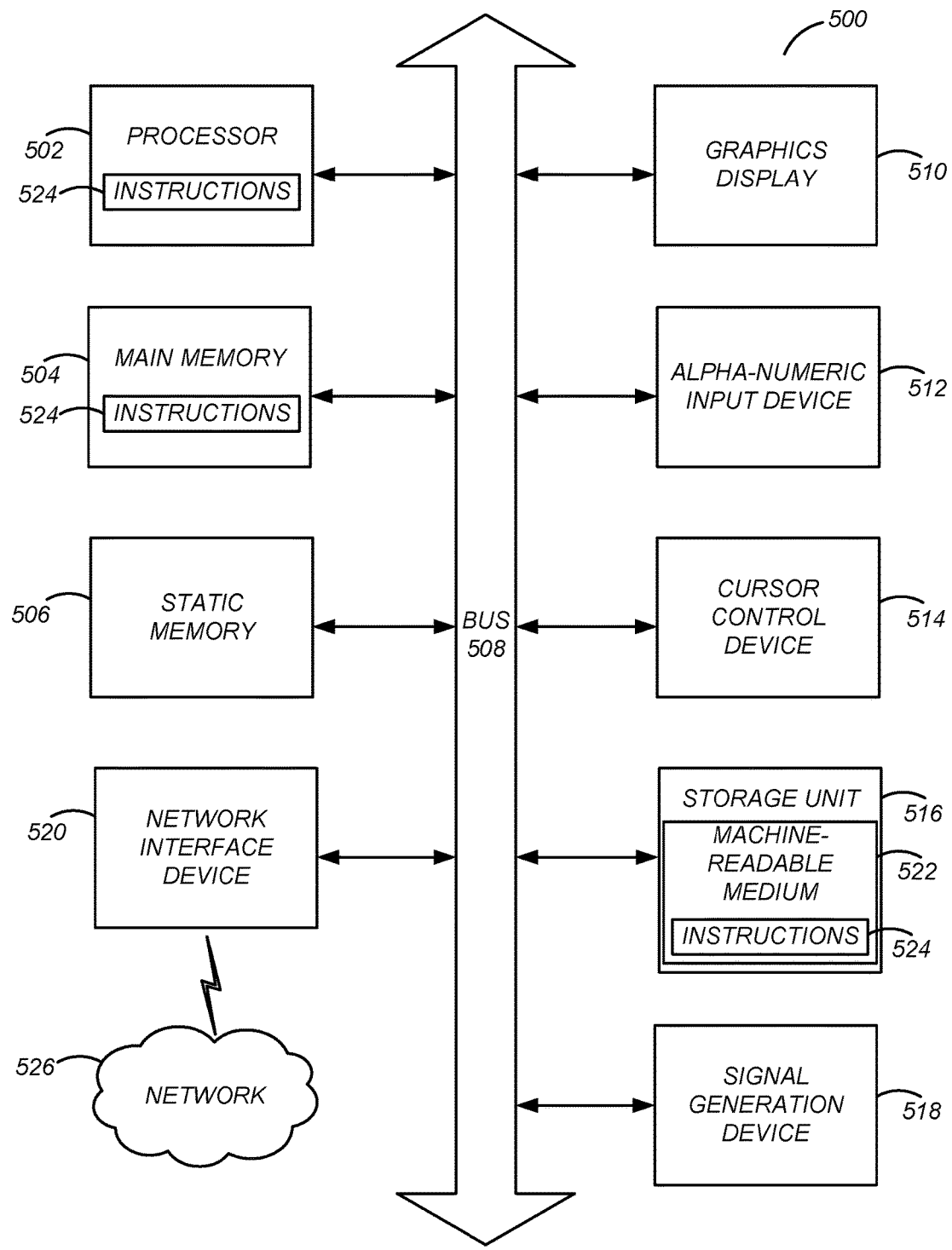
FIG. 5 illustrates components of an example machine able to read instructions from a machine-readable medium and execute them in a computer processor (or controller), according to one embodiment.

FIG. 5 is a block diagram illustrating components of an example computing device 500 able to read instructions from a non-transitory machine-readable medium and execute them in a processor (or controller) for implementing the system and performing the associated methods described above. The computing device may be any computing device capable of executing instructions 524 (sequential or otherwise) that specify actions to be taken by that machine. Further, while only a computing device is illustrated, the term "computing device" shall also be taken to include any collection of computing devices that individually or jointly execute instructions 524 to perform any one or more of the methodologies discussed herein.

The example computing device 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computing device 500 may further include graphics display unit 510 (e.g., a plasma display panel (PDP), an organic light emitting diode (OLED) display, a liquid crystal display (LCD), a projector, or a cathode ray tube (CRT)) and corresponding display drivers. The computing device 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a non-transitory machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computing device 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

VI. Additional Configuration Considerations

Certain embodiments are described herein as including logic or a number of components, modules, or mechanisms, for example, as illustrated in FIGS. 1 and 2. Modules may constitute either software modules (e.g., code embodied on a machine-readable medium) or hardware modules. A hardware module is tangible unit capable of performing certain operations and may be configured or arranged in a certain manner. In example embodiments, one or more computing devices may include one or more hardware modules for implementing the operations described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The hardware or software modules may also operate to support performance of the relevant operations in a "cloud computing" environment or as a "software as a service" (SaaS). For example, at least some of the operations may be performed by a group of computing devices, these operations being accessible via a network (e.g., the Internet) and via one or more appropriate interfaces (e.g., application program interfaces (APIs)). The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative designs for a system and a process for matching dynamic segments and semi-static segments together through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving, by one or more processors of a match-merge system, a subject video;
    identifying, by the one or more processors of the match-merge system, within the subject video a set of one or more dynamic segments, wherein dynamic segments are segments having content that varies more than a threshold amount over a period of time;
    identifying, by the one or more processors of the match-merge system, within the subject video a set of one or more semi-static segments, wherein semi-static segments are segments having content that varies less than the threshold amount over a period of time;
    determining, by the one or more processors of the match-merge system, matches between the one or more dynamic segments and one or more reference dynamic segments;
    determining, by the one or more processors of the match-merge system, matches between the one or more semi-static segments and one or more reference semi-static segments; and
    generating, by the one or more processors of the match-merge system, a match merge list including one or more entries, each entry indicating:
        a grouped segment including a sequential occurrence of a dynamic segment and a semi-static segment, and
        a reference grouped segment of a reference video including a sequential occurrence of a reference dynamic segment and a reference semi-static segment,
        wherein the reference dynamic segment matches the dynamic segment and the reference semi-static segment matches the semi-static segment.

2. The method of claim 1, further comprising determining, by the one or more processors of the match-merge system, a fingerprint for each of the one or more dynamic segments and wherein determining the matches between the one or more dynamic segments and the one or more reference dynamic segments comprises determining matches between the fingerprints and one or more reference fingerprints associated with the reference video.

3. The method of claim 2, wherein each fingerprint corresponds to a respective dynamic segment of the one or more dynamic segments and includes metadata information including a video identifier identifying the subject video and a segment identifier identifying a period of time the corresponding dynamic segment occurs in the subject video.

4. The method of claim 1, further comprising extracting, by the one or more processors of the match-merge system, an image for each of the one or more semi-static segments, wherein determining the matches between the one or more semi-static segments and the one or more reference semi-static segments comprises determining matches between the images and one or more reference images.

5. The method of claim 4, wherein each image corresponds to a respective semi-static segment of the one or more semi-static segments and includes metadata information including a video identifier identifying the subject video and a segment identifier identifying a period of time the corresponding semi-static segment occurs in the subject video.

6. The method of claim 1,
    wherein determining the matches between the one or more dynamic segments and the one or more reference dynamic segments further comprises:

determining a dynamic segment match likelihood representing a numerical likelihood a given reference dynamic segment matches a given dynamic segment, and wherein determining the matches between the one or more semi-static segments and the one or more reference semi-static segments further comprises:
determining a semi-static segment match likelihood representing a numerical likelihood a give reference semi-static segment matches a given semi-static segment.

7. The method of claim 1, wherein generating the match merge list comprises generating, for each of the one or more entries, an aggregate match likelihood representing a numerical likelihood that a reference grouped segment of a reference video matches a grouped segment of the subject video.

8. The method of claim 7, further comprising:
ranking, by the one or more processors of the match-merge system, the one or more entries of the match merge list based on the aggregate match likelihoods to obtain a ranked match merge list; and
providing, by the one or more processors of the match-merge system, the ranked match merge list.

9. A system comprising:
a non-transitory computer-readable storage medium storing executable computer instructions that, when executed, perform steps comprising:
receiving a subject video;
identifying within the subject video a set of one or more dynamic segments, wherein dynamic segments are segments having content that varies more than a threshold amount over a period of time;
identifying within the subject video a set of one or more semi-static segments, wherein semi-static segments are segments having content that varies less than the threshold amount over a period of time;
determining matches between the one or more dynamic segments and one or more reference dynamic segments;
determining matches between the one or more semi-static segments and one or more reference semi-static segments; and
generating a match merge list including one or more entries, each entry indicating:
a grouped segment including a sequential occurrence of a dynamic segment and a semi-static segment, and
a reference grouped segment of a reference video including a sequential occurrence of a reference dynamic segment and a reference semi-static segment,
wherein the reference dynamic segment matches the dynamic segment and the reference semi-static segment matches the semi-static segment; and
a processor configured to execute the computer instructions.

10. The system of claim 9, wherein the computer instructions, when executed, further perform steps comprising determining a fingerprint for each of the one or more dynamic segments and wherein determining the matches between the one or more dynamic segments and the one or more reference dynamic segments comprises determining matches between the fingerprints and one or more reference fingerprints associated with the reference video.

11. The system of claim 10, wherein each fingerprint corresponds to a respective dynamic segment of the one or more dynamic segments and includes metadata information including a video identifier identifying the subject video and a segment identifier identifying a period of time the corresponding dynamic segment occurs in the subject video.

12. The system of claim 9, wherein the computer instructions, when executed, further perform steps comprising extracting an image for each of the one or more semi-static segments, wherein determining the matches between the one or more semi-static segments and the one or more reference semi-static segments comprises determining matches between the images and one or more reference images.

13. The system of claim 12, wherein each image corresponds to a respective semi-static segment of the one or more semi-static segments and includes metadata information including a video identifier identifying the subject video and a segment identifier identifying a period of time the corresponding semi-static segment occurs in the subject video.

14. The system of claim 9, wherein the computer instructions, when executed, perform steps comprising determining the matches between the one or more dynamic segments and the one or more reference dynamic segments further comprises instructions that, when executed, perform steps comprising:
determining a dynamic segment match likelihood representing a numerical likelihood a given reference dynamic segment matches a given dynamic segment, and
wherein the instructions that, when executed, perform steps comprising determining the matches between the one or more semi-static segments and the one or more reference semi-static segments further comprises instructions that, when executed, perform steps comprising:
determining a semi-static segment match likelihood representing a numerical likelihood a give reference semi-static segment matches a given semi-static segment.

15. The system of claim 9, wherein the computer instructions, when executed, perform steps comprising generating the match merge list further comprises instructions that, when executed perform steps comprising generating, for each of the one or more entries, an aggregate match likelihood representing a numerical likelihood that a reference grouped segment of a reference video matches a grouped segment of the subject video.

16. The system of claim 15, wherein the computer instructions, when executed, further perform steps comprising:
ranking the one or more entries of the match merge list based on the aggregate match likelihoods to obtain a ranked match merge list; and
providing the ranked match merge list.

17. A non-transitory computer-readable storage medium storing executable computer instructions that, when executed by a processor, perform steps comprising:
receiving a subject video;
identifying within the subject video a set of one or more dynamic segments, wherein dynamic segments are segments having content that varies more than a threshold amount over a period of time;
identifying within the subject video a set of one or more semi-static segments, wherein semi-static segments are segments having content that varies less than the threshold amount over a period of time;
determining matches between the one or more dynamic segments and one or more reference dynamic segments;

determining matches between the one or more semi-static segments and one or more reference semi-static segments; and generating a match merge list including one or more entries, each entry indicating:
- a grouped segment including a sequential occurrence of a dynamic segment and a semi-static segment, and
- a reference grouped segment of a reference video including a sequential occurrence of a reference dynamic segment and a reference semi-static segment, wherein the reference dynamic segment matches the dynamic segment and the reference semi-static segment matches the semi-static segment.

18. The non-transitory computer-readable storage medium of claim 17, wherein the computer instructions, when executed by the processor, perform further steps comprising determining a fingerprint for each of the one or more dynamic segments and wherein determining the matches between the one or more dynamic segments and the one or more reference dynamic segments comprises determining matches between the fingerprints and one or more reference fingerprints associated with the reference video.

19. The non-transitory computer-readable storage medium of claim 18, wherein each fingerprint corresponds to a respective dynamic segment of the one or more dynamic segments and includes metadata information including a video identifier identifying the subject video and a segment identifier identifying a period of time the corresponding dynamic segment occurs in the subject video.

20. The non-transitory computer-readable storage medium of claim 17, wherein the computer instructions, when executed by the processor, perform further steps comprising extracting an image for each of the one or more semi-static segments, wherein determining the matches between the one or more semi-static segments and the one or more reference semi-static segments comprises determining matches between the images and one or more reference images.

21. The non-transitory computer-readable storage medium of claim 20, wherein each image corresponds to a respective semi-static segment of the one or more semi-static segments and includes metadata information including a video identifier identifying the subject video and a segment identifier identifying a period of time the corresponding semi-static segment occurs in the subject video.

22. The non-transitory computer-readable storage medium of claim 17, wherein the computer instructions, when executed by the processor, perform steps comprising determining the matches between the one or more dynamic segments and the one or more reference dynamic segments perform further steps comprising: determining a dynamic segment match likelihood representing a numerical likelihood a given reference dynamic segment matches a given dynamic segment, and wherein the computer instructions, when executed by the processor perform steps comprising determining the matches between the one or more semi-static segments and the one or more reference semi-static segments perform further steps comprising: determining a semi-static segment match likelihood representing a numerical likelihood a give reference semi-static segment matches a given semi-static segment.

23. The non-transitory computer-readable storage medium of claim 17, wherein the computer instructions, when executed by the processor, perform steps comprising generating the match merge list perform further steps comprising generating, for each of the one or more entries, an aggregate match likelihood representing a numerical likelihood that a reference grouped segment of a reference video matches a grouped segment of the subject video.

24. The non-transitory computer-readable storage medium of claim 23, wherein the computer instructions, when executed by the processor, perform further steps comprising:

ranking the one or more entries of the match merge list based on the aggregate match likelihoods to obtain a ranked match merge list; and providing the ranked match merge list.

* * * * *